(12) United States Patent
Regnat et al.

(10) Patent No.: US 11,789,705 B2
(45) Date of Patent: Oct. 17, 2023

(54) METHOD, COMPUTER PROGRAM PRODUCT AND MODELING TOOL FOR THE REFERENCE MODEL-BASED, COMPONENT-RELATED DEVELOPMENT OF A TECHNICAL SYSTEM

(71) Applicant: Siemens Aktiengesellschaft, Munich (DE)

(72) Inventors: Nikolaus Regnat, Munich (DE); Sieglinde Kranz, Germering (DE); Dominik Oeh, Altendorf (DE)

(73) Assignee: SIEMENS AKTIENGESELLSCHAFT

( * ) Notice: Subject to any disclaimer, the term of this patent is extended or adjusted under 35 U.S.C. 154(b) by 29 days.

(21) Appl. No.: 17/539,390

(22) Filed: Dec. 1, 2021

(65) Prior Publication Data
US 2022/0197604 A1 Jun. 23, 2022

(30) Foreign Application Priority Data
Dec. 21, 2020 (EP) .................................... 20216045

(51) Int. Cl.
*G06F 8/35* (2018.01)
*G06F 8/36* (2018.01)

(52) U.S. Cl.
CPC . *G06F 8/35* (2013.01); *G06F 8/36* (2013.01)

(58) Field of Classification Search
None
See application file for complete search history.

(56) References Cited

U.S. PATENT DOCUMENTS

| 7,337,102 B2 * | 2/2008 | Mosterman | G06F 8/10 |
| | | | 703/21 |
| 8,230,388 B2 * | 7/2012 | Lee | G06F 9/465 |
| | | | 717/104 |

(Continued)

OTHER PUBLICATIONS

Sharma, "A Design Based New Reusable Software Process Model For Component Based Development Environment", 2016, International Conference on Computational Modeling and Security (Year: 2016).*

(Continued)

*Primary Examiner* — Hossain M Morshed
(74) *Attorney, Agent, or Firm* — Schmeiser, Olsen & Watts LLP

(57) ABSTRACT

To automate the system development for a system component of a technical system developed on the basis of a reference model, a computer-based access is orchestrated, which contributes to the function of the technical system, a reference model component suitable for this purpose is determined for the reference system, (i) in a first orchestration phase to determine a storage location in the digital twin for the reference model component suitable for this purpose, (ii) in a second orchestration phase to determine a sub-model content of the digital twin associated with the storage location and a reduction potential of the sub-model content with respect to an extent required with the re-use of the reference model component for system development and (iii) in a third orchestration phase, to perform a reduction of the sub-model content according to the determined reduction potential and to generate the reference model component.

7 Claims, 5 Drawing Sheets

(56) References Cited

U.S. PATENT DOCUMENTS

| | | | | |
|---|---|---|---|---|
| 2013/0332897 | A1* | 12/2013 | Dim | G06F 8/35 |
| | | | | 717/104 |
| 2017/0286068 | A1* | 10/2017 | Shiokawa | G06F 8/36 |
| 2020/0226742 | A1* | 7/2020 | Sawlani | H01L 21/67288 |
| 2022/0197604 | A1* | 6/2022 | Regnat | G06F 30/10 |
| 2022/0198099 | A1* | 6/2022 | Regnat | G06F 30/20 |

OTHER PUBLICATIONS

Broy, Manfred et al: "Seamless Model-Based Development: From Isolated Tools to Integrated Model Engineering Environments": Proceedings of the IEEE; IEEE; New York; vol. 98; No. 4; 526-545; XP011350419; ISSN: 0018-9219; DOI: 10.1109/JPROC.2009. 2037771; 2010.

Wright, Louise et al: "How to tell the difference between a model and a digital twin"; Advanced Modeling and Simulation in Engineering Sciences; Biomed Central Ltd; London; vol. 7; No. 1; pp. 1-13; XP021273689; DOI: 10.1186/S40323-020-00147-4; 2020.

Dassault Systemes: "Abaqus 6.14—Abaqus/CAE User's Guide";pp. 1-1146; XP055807547; URL:http://130.149.89.49:2080/v6.14/pdf books/CAE.pdf; 2014.

* cited by examiner

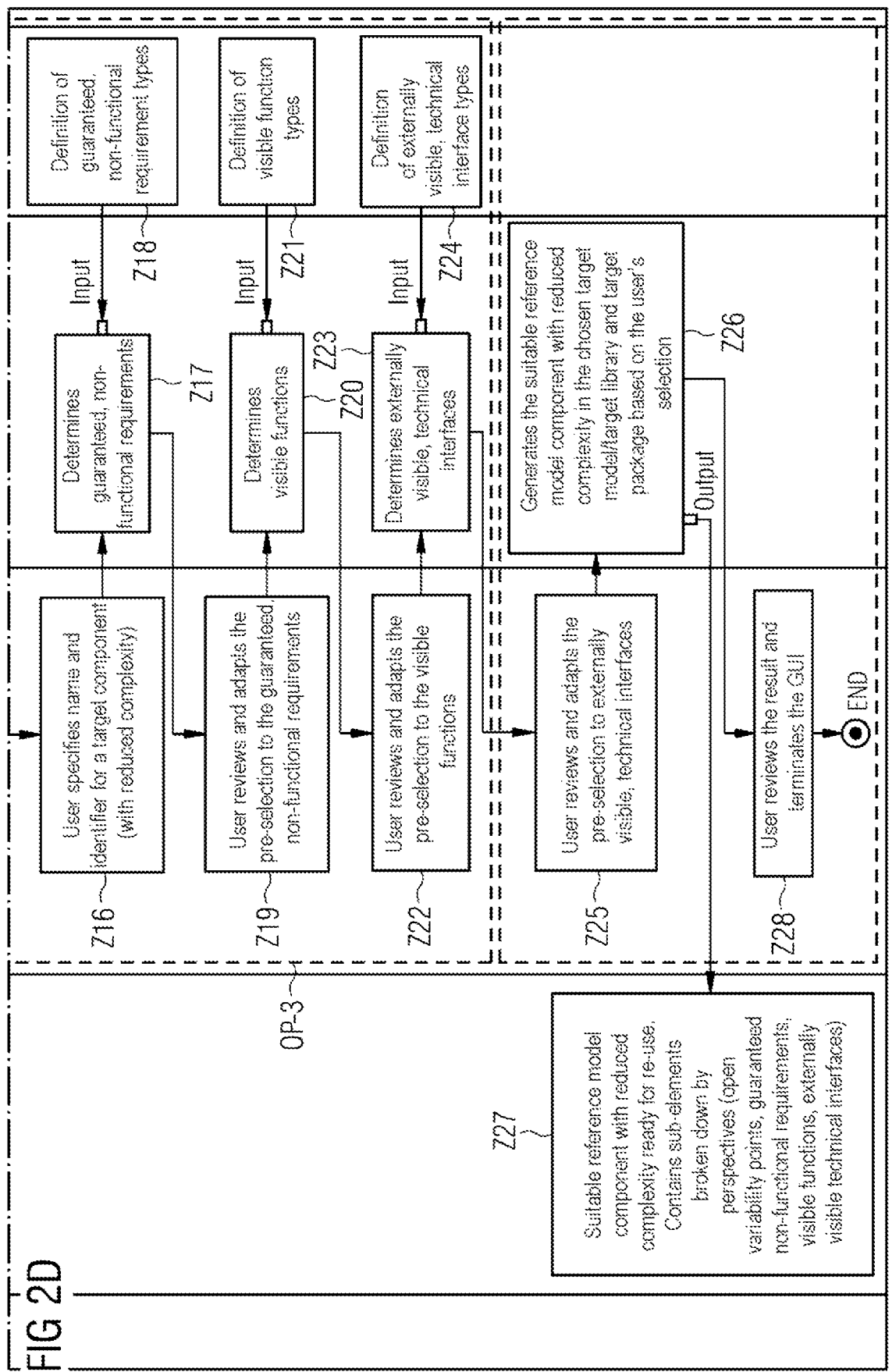

METHOD, COMPUTER PROGRAM PRODUCT AND MODELING TOOL FOR THE REFERENCE MODEL-BASED, COMPONENT-RELATED DEVELOPMENT OF A TECHNICAL SYSTEM

CROSS-REFERENCE TO RELATED APPLICATIONS

This application claims priority to European Application No. 20216045.3, having a filing date of Dec. 21, 2020, the entire contents of which are hereby incorporated by reference.

FIELD OF TECHNOLOGY

The following relates to a method for the reference model-based, component-related development of a technical system, a computer program product for the reference model-based, component-related development of a technical system, and a modeling tool for the reference model-based, component-related development of a technical system.

BACKGROUND

In the development of complex systems of different technical domains, hereafter referred to as a technical system, it is appropriate to use existing systems, i.e., previously developed systems, of the same or comparable technical domain and of different or comparable complexity and to re-use their system components which in many cases are contained in the existing systems and which contribute to the functions of the existing systems. Such systems are referred to hereafter as technical reference systems and their system components as reference system components.

The mentioned technical domains can be of arbitrary types. For example, in a non-exhaustive list: automation technology, energy technology, communication technology, medical technology, automotive technology relating to vehicles for road, rail, water or air.

If model-based methods are used for the development of such technical systems, reference models of the complex reference systems must also be taken into account in their re-use. Such complex reference models represent the respective technical reference system in digital form and are therefore referred to as digital twins. Each digital twin of a technical reference system, in which the complex reference model of this system is stored, represents the corresponding reference system digitally. However, re-use of complex modeled reference systems and/or reference system components is only possible in very limited ways in current graphical modeling tools.

Previous approaches either do not solve this problem at all, or only partially. Usually, all model information of a complex modeled reference system with its reference system components is transferred for re-use. However, this approach leads to a number of problems:

In the case of frequent re-use—a so-called "systems-of-systems" development, the amount of model information increases with each stage of re-use. This not only makes it increasingly difficult for modeling tools to manage this information, but most importantly, is especially difficult for human users to handle.

Critical (e.g., IP-relevant) information is disclosed and is thus no longer protected. In addition, internal changes will also be disclosed and may result in increased effort to keep the models up-to-date.

Other approaches also exist for releasing only parts of the model information for re-use. However, these methods are either very expensive for the user or very limited in the selection of the partial information.

SUMMARY

An aspect relates to a method, a computer program product (non-transitory computer readable storage medium having instructions, which when executed by a processor, perform actions), and a modeling tool for the reference model-based, component-related development of a technical system in which the system development can be automated for a system component of the technical system to be developed on the basis of a reference model.

In addition, this aspect is achieved on the basis of the computer program product defined by a computer program product, comprising a computer readable hardware storage device having computer readable program code stored therein, said program code executable by a processor of a computer system to implement a method for the reference model-based, component-related development of a technical system comprising a non-volatile, readable memory in which processor-readable control program commands of a program module for reference model-based, component-related development of the technical system are stored, and comprising a processor which is connected to the memory and executes the control program commands of the program module for system development, wherein for this purpose in relation to a technical reference system comprising a plurality of reference system components, each contributing to the function of the technical reference system and being represented digitally by a stored digital twin as a complex reference model of the technical reference system, reference model components for the development of the technical system can be re-used by accessing the digital twin.

Furthermore, this aspect is achieved on the basis of the modeling tool for the reference model-based, component-related development of a technical system, in which, with respect to a technical reference system comprising a plurality of reference system components, each contributing to the function of the technical reference system and being digitally represented by a stored digital twin as a complex reference model of the technical reference system, reference model components for the development of the technical system can be re-used by accessing the digital twin, comprising a control device and an input/output interface connected to the control device for user input and output, wherein for the system development the control device is connected to a database for storing the digital twin.

The idea underlying embodiments of the invention according to the technical teaching relating to a method; relating to a computer program product; and relating to a modeling tool consists in that, by a) accessing a stored digital twin as a complex reference model and digital representation of a technical reference system with a plurality of reference system components, each contributing to the function of the technical reference system, reference model components are re-usable for the development of the technical system, b) computer-based access orchestration, in which the access is orchestrated with a user-based data and command input as well as a logic-based data processing and command implementation according to a rules-based specification, and for a dedicated system component provided for the development of the technical system, in particular by user selection, which contributes to the function of the technical system, a reference model component of the re-usable reference model components which is suitable for this purpose is determined with respect to the reference system using the reference system components, b1) in a first orchestration phase a storage location in the digital twin is determined for the reference model component suitable for the development of the technical system, b2) in a second orchestration phase, a sub-model content of the digital twin associated with the storage location and a reduction potential of the sub-model content are determined with respect to an extent required with the re-use of the reference model component for the development of the technical system, b3) in a third orchestration phase a reduction of the sub-model content is carried out according to the determined reduction potential and the reference model component is generated.

In contrast to the known solutions, the approach proposed above makes it significantly easier to identify, re-use, and provide model components for a reference model-based, component-related development of a technical system. By reducing the information to the extent necessary for the re-use, critical information, such as that related to intellectual property, is also protected.

BRIEF DESCRIPTION

Some of the embodiments will be described in detail, with references to the following Figures, wherein like designations denote like members, wherein:

FIG. 2 shows a flow diagram for the reference model-based, component-related development of the technical system according to the scenario shown in FIG. 1;

FIG. 2D shows a component of flow diagram for the reference model-based, component-related development of the technical system according to FIG. 2.

DETAILED DESCRIPTION

Figure 1:
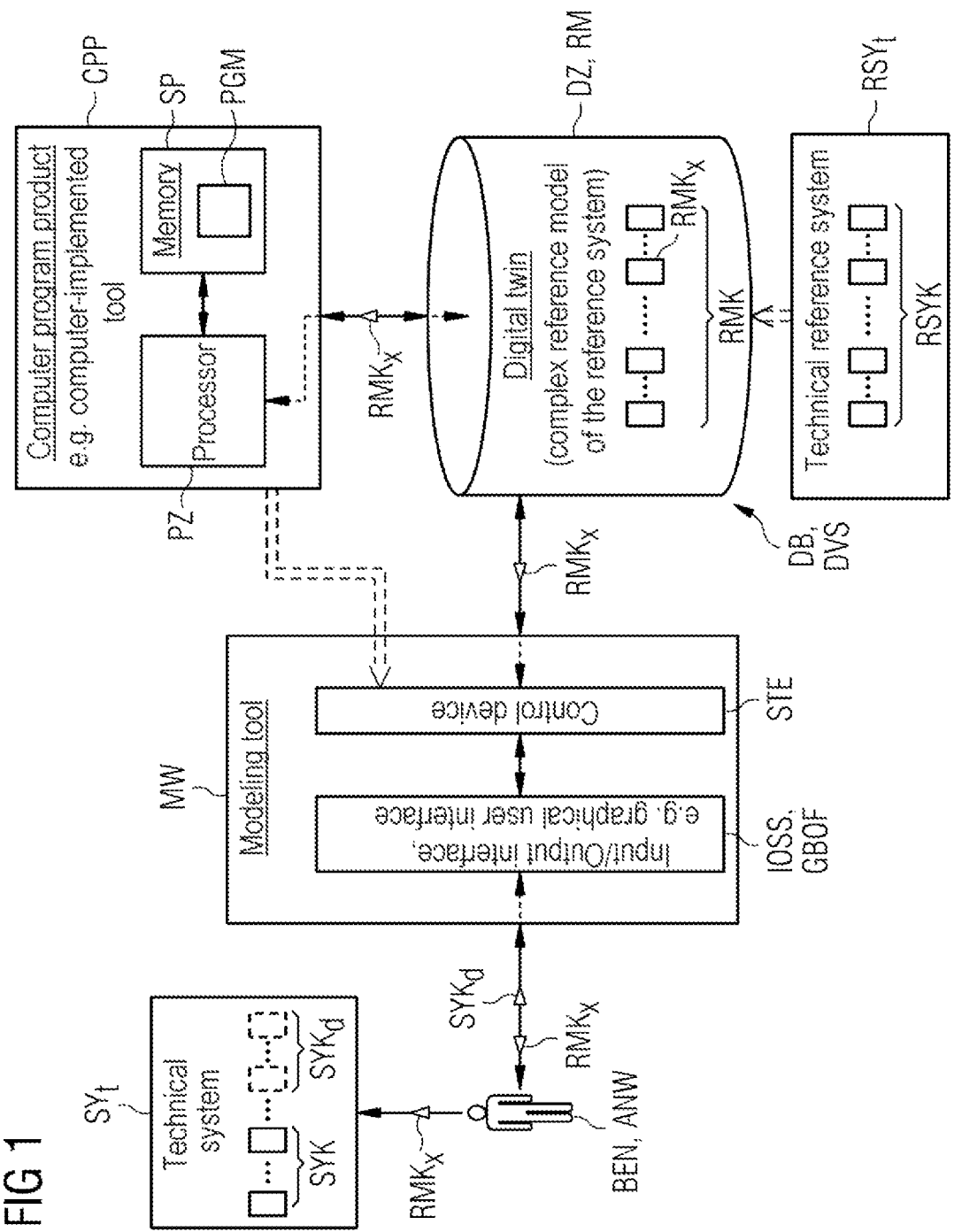
FIG. 1 shows a scenario for the reference model-based, component-related development of a technical system.

FIG. 1 shows a scenario for the reference model-based, component-related development of a technical system $SY_t$. In the finally developed state, such a technical system $SY_t$ contains a plurality of system components SYK which represent subsystems of the technical system $SY_t$ and which each contribute to the function of the technical system $SY_t$. However, the technical system $SY_t$ presented in FIG. 1 is not yet fully developed, which is shown by system components or subsystems drawn in dashed lines. For example, there is a dedicated system component $SYK_d$ intended for the development of the technical system $SY_t$, which like the other system components also contributes to the function of the technical system $SY_t$. The intended development of the technical system $SY_t$ in this regard will be based according to embodiments of the invention on the reference model, which is explained in the following and later in the context of the description of FIG. 2.

The technical system $SY_t$ is the subject of a "physical world" and according to the definition given at the beginning for technical domains can be, e.g., in the field of medical technology a computer tomograph or a magnetic resonance tomograph, or in the field of energy technology a wind turbine, or in the field of automotive technology a passenger car (automobile). The dedicated system component or the dedicated subsystem $SYK_d$ which is intended for the development of the technical system $SY_t$ could therefore be, for example, a detector in the field of medical technology, or a generator in the field of energy technology, or an engine in the field of vehicle technology.

Further subjects of the "physical world" according to the scenario shown for the reference model-based, component-related development of the technical system $SY_t$ are a technical reference system $RSY_t$ with a plurality of reference system components RSYK, which in turn also contribute to the function of the technical reference system $RSY_t$, and a modeling tool MW for the model-based development of complex technical systems, implemented as a workstation or personal computer.

Both are the link to a "digital world" insofar as the technical reference system $RSY_t$ with the reference system components RSYK, which is the same or comparable with the technical system $SY_t$ in relation to the technical domain and can be different or comparable in relation to the system complexity, is represented digitally by a digital twin DZ, stored in a database DB or in a data processing system DVS and belonging to the "digital world", as a complex reference model RM of the technical reference system $RSY_t$ and the modeling tool MW can re-use reference model components RMK for the development of the technical system $SY_t$ by accessing the digital twin DZ, and a suitable reference model component $RMK_x$ of the re-usable reference model components RMK is determined for this purpose, e.g. by selection.

In order to be able to re-use this suitable reference model component $RMK_x$, the modeling tool MW has a control device STE and an input/output interface IOSS, connected to the control device STE and designed as a graphical user interface GBOF for user inputs and outputs of a user BEN or user ANW of the modeling tool MW.

The control device STE is connected to the database DB or the data processing system DVS for the development of the technical system $SY_t$ and for access to the digital twin DZ.

However, the re-use of the reference model component $RMK_x$ is carried out neither by the modeling tool MW nor by the control device STE as such, rather the re-use is the subject of another digital component in the "digital world". This digital component is a computer program product CPP for the reference model-based, component-related development of the technical system $SY_t$, which is designed as a computer-implemented tool and represents an application software, also referred to as "APP".

Furthermore, the computer program product CPP has a non-volatile, readable memory SP, in which processor-readable control program commands of a program module PGM for the reference model-based, component-related development of the technical system $SY_t$ are stored, as well as a processor PZ which is connected to the memory SP and executes the control program commands of the program module PGM for system development and, in this context, performs the determination of the reference model component $RMK_x$.

This computer program product CPP, which as a computer-implemented tool or the "APP" can be loaded into the control device STE for the reference model-based, component-related development of the technical system $SY_t$ [represented in FIG. 1 by the dashed double arrow (double-base arrow)] and can be developed and distributed independently of the modeling tool MW.

The functioning of the reference model-based, component-related development of the technical system $SY_t$ and in this context the re-use of the reference model component $RMK_x$ according to the scenario shown, and how it is processed in the modeling tool MW and in the computer program product CPP, will now be explained in conjunction with FIG. 2.

Figure 2A:
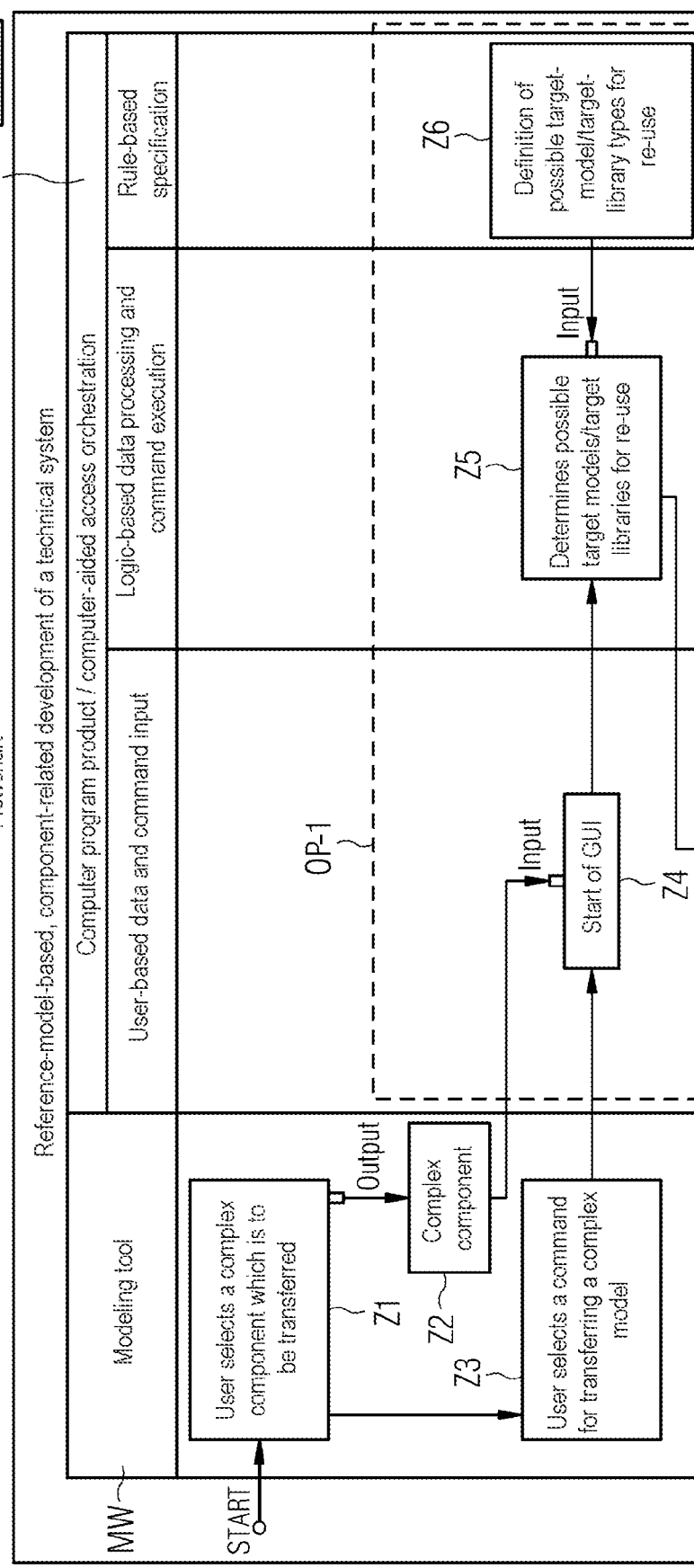
FIG. 2A shows a component of flow diagram for the reference model-based, component-related development of the technical system according to FIG. 2.
Figure 2B:
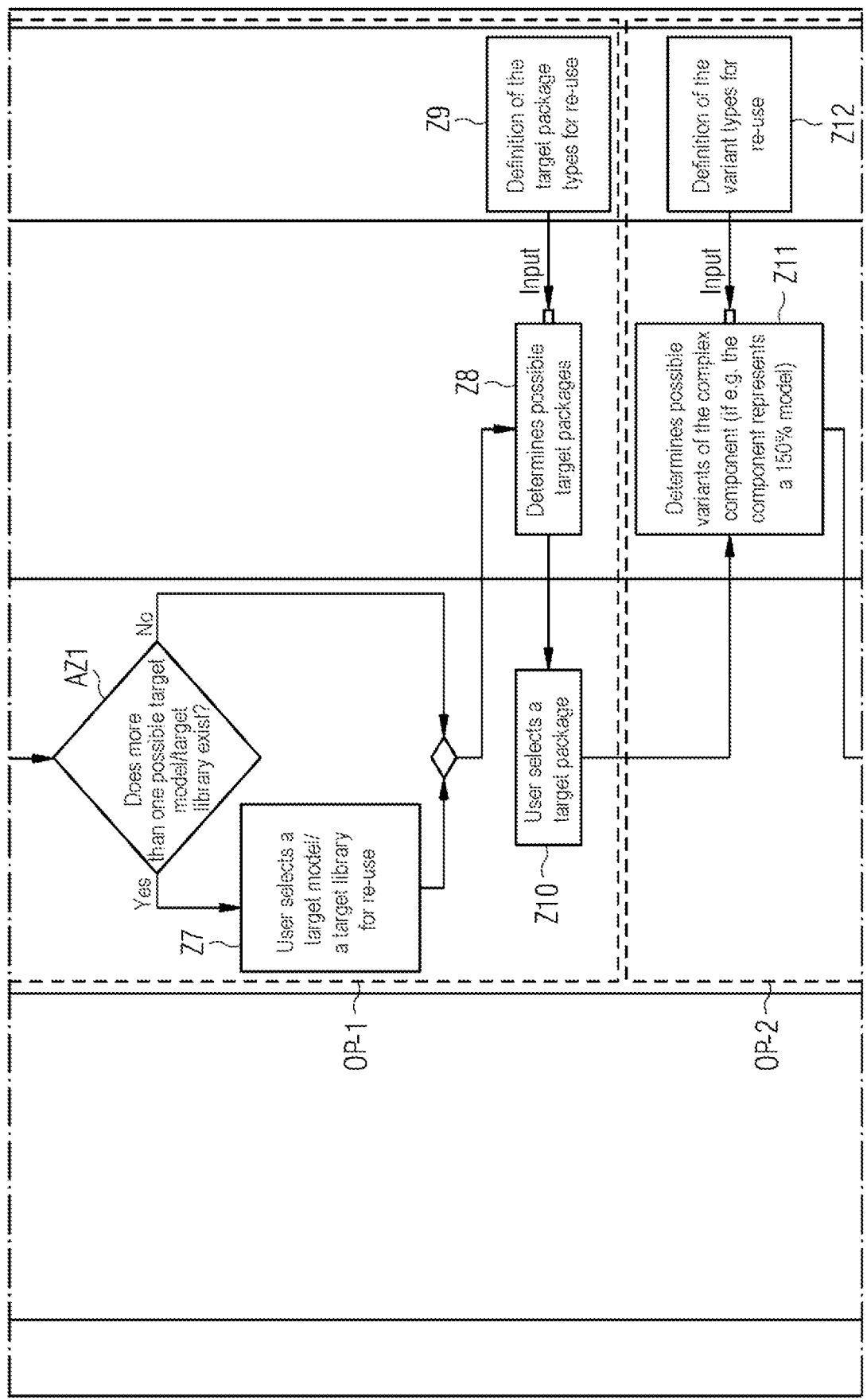
FIG. 2B shows a component of flow diagram for the reference model-based, component-related development of the technical system according to FIG. 2.
Figure 2C:
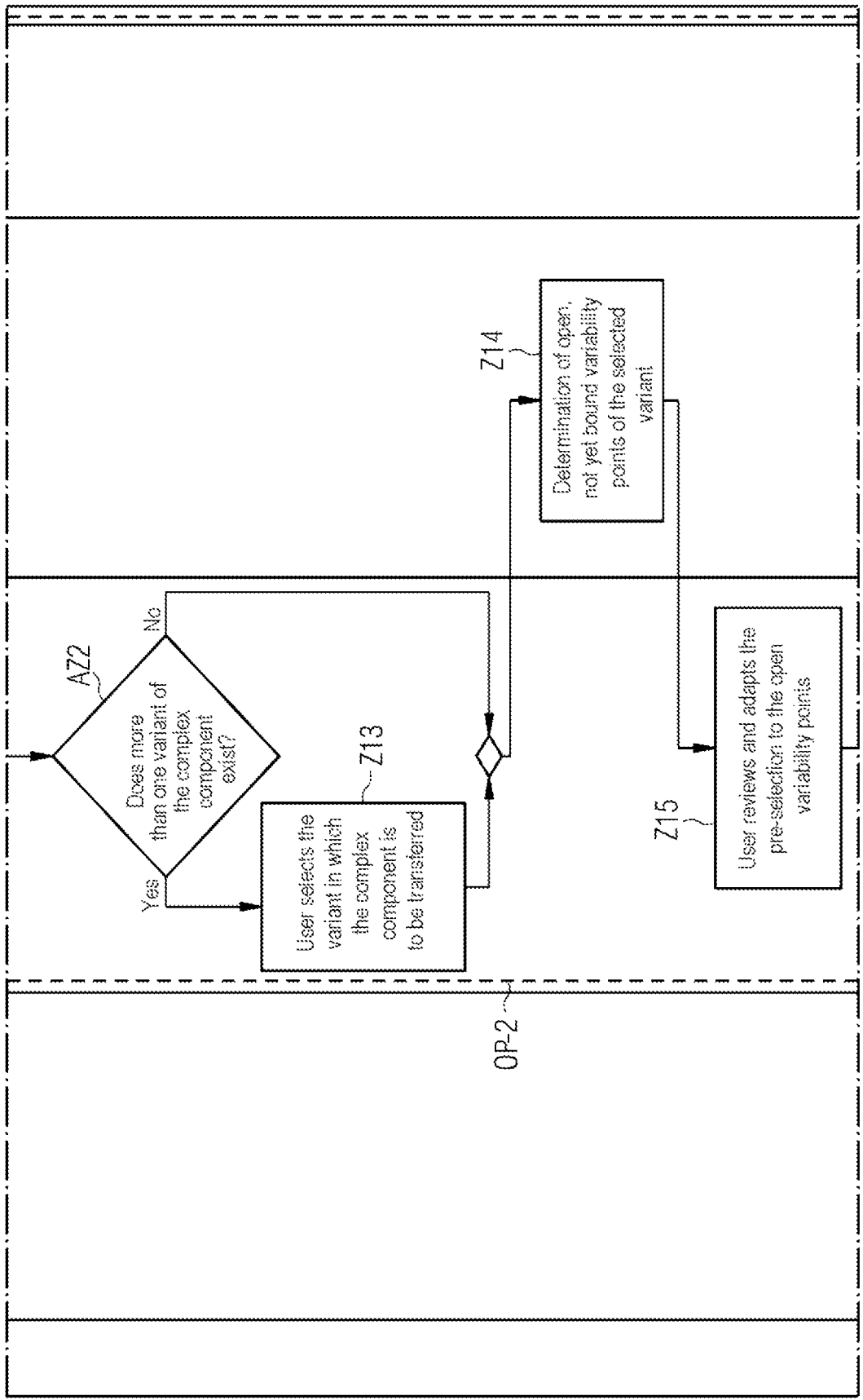
FIG. 2C shows a component of flow diagram for the reference model-based, component-related development of the technical system according to FIG. 2.

FIG. 2 shows a flowchart for the reference model-based, component-related development of the technical system $SY_t$ according to the scenario shown in FIG. 1. According to this flowchart, the development of the technical system $SY_t$ in the context of the re-use of the reference model component $RMK_x$ is essentially performed by an access orchestration ZGO, in which according to this scenario, supported by the computer program product CPP or in a computer-aided manner, the accesses to the digital twin DZ for the re-use of the suitable reference model component $RMK_x$ from the re-usable reference model components RMK of the digital twin DZ are orchestrated.

The access orchestration ZGO, according to which each access is orchestrated with a user-based data and command input as well as a logic-based data processing and command implementation according to a rule-based specification, is divided according to the flowchart shown in FIG. 2 into three orchestration phases, a first orchestration phase OP-1, a second orchestration phase OP-2, and a third orchestration phase OP-3.

The phrase 'according to a rule-based specification' here means that rules are used to define which pieces of information, e.g., aspects of the reference model or the digital twin, are relevant to the development of a component of the system $SY_t$. These rules are therefore used as a basis for identifying which information must be transferred for re-use for the development of the system component and which can be omitted. In addition, the rules define how information should be transformed or converted.

These rules can be pre-defined and they determine the way in which a reduction of aspects of the reference model is performed, i.e., which information should be omitted.

According to the flowchart, the system development starts with a first state Z1 according to FIG. 1, in which the user ANW or user BEN uses the modeling tool MW for a component of the system $SY_t$, e.g., the dedicated system component $SYK_d$, to select a complex component of the reference model, for example the reference model component $RMK_x$, which is to be transferred for re-use for the system development. In a second state Z2 the complex component for the transfer is specified, and in a third state Z3 a command is selected by the user ANW or user BEN to transfer the complex component.

This is the transition from the modeling tool MW to the first orchestration phase OP-1 of the access orchestration ZGO supported by the computer program product CPP or computer-aided. In a fourth state Z4 the graphical user interface GBOF (<GUI>) is first started in the course of the user-based data and command input for the access orchestration ZGO.

On the basis of the specified complex component (see state Z2) and the command selection (see state Z3), in the first orchestration phase OP-1, in which the aim is to determine a storage location in the digital twin DZ for the reference model component $RMK_x$ suitable for the development of the technical system $SY_t$, in a fifth state Z5 in the course of the logic-based data processing and command implementation during the access orchestration ZGO, possible target models and/or possible target libraries are determined.

Target library and target model relate solely to the storage location in the database DB or in the data processing system DVS, where the reference model for re-use is to be provided. This can be the database DB, for example, which serves as a library (target library) with a defined substructure as a package (target package).

For this determination of the storage location, possible target-model and/or target-library types for the re-use are defined in a sixth state Z6 in the course of the rule-based definition during the access orchestration ZGO.

If the possible target models and/or target libraries have been determined (see state Z5), then in a first query state AZ1 in the course of the user-based data and command input during the access orchestration ZGO it is queried whether a plurality of possible target models and/or target libraries exist. If the query result is "YES", in the course of the user-based data and command input during the access orchestration ZGO a target model and/or a target library is selected by the user ANW or user BEN in a seventh state Z7 and then processing continues directly to the system development in an eighth state Z8, whereas if the query result is "NO", processing continues directly to the system development in the eighth state Z8.

In this eighth state Z8, possible target packets are determined in the course of the logic-based data processing and command implementation during the access orchestration ZGO. For an explanation of what a target package is, reference is made to the explanations for "target library and target model" (see above comments on state Z5).

For this determination of the possible target packages in the course of a staged determination of the storage location (1st stage involves determining the possible target models and/or target libraries and the 2nd stage involves determining the possible target packages), in a ninth state Z9 possible target-package types are defined for the re-use in the course of the rule-based specification during the access orchestration ZGO.

At the end of the first orchestration phase OP-1, in a tenth state Z10 a target package is selected from the possible target packages by the user ANW or user BEN in the course of the user-based data and command input during the access orchestration ZGO.

With the selection of the target package and thus the determination of the storage location, the transition from the first orchestration phase OP-1 to the second orchestration phase OP-2 takes place according to the access orchestration ZGO.

According to the second orchestration phase OP-2 during the access orchestration ZGO, a sub-model content of the digital twin DZ associated with the storage location and a reduction potential of the sub-model content are determined in relation to an extent required with the re-use of the reference model component $RMK_x$ for the development of the technical system $SY_t$.

The starting point for this is after the transition from the first orchestration phase OP-1 from the tenth state Z10 to the second orchestration phase OP-2 into an eleventh state Z11. In this eleventh state Z11, possible variants of the complex component are determined in the course of the logic-based data processing and command implementation during the access orchestration ZGO. This is the case, for example, if the complex component represents a larger model, such as a 150% model.

If the complex component represents a plurality of real components, the choice must be made as to which or all of these variants are to be made available for re-use.

For this determination of the possible variants, in a twelfth state Z12 possible variant-types for the re-use are defined in the course of the rule-based definition during the access orchestration ZGO.

If the possible variants have been determined (see state Z11), then in a second query state AZ2 in the course of the user-based data and command input during the access orchestration ZGO it is queried whether a plurality of possible variants of the complex component exist. If the query result is "YES", in the course of the user-based data and command input during the access orchestration ZGO, in a thirteenth state Z13 the user ANW or user BEN selects a variant in which the complex component will be transferred for re-use and then processing continues directly to the system development in a fourteenth state Z14, whereas if the query result is "NO", processing continues directly to the system development in the fourteenth state Z14. The selection involves a pre-selection.

In this fourteenth state Z14, possible variability points of the selected variant are identified in the course of the logic-based data processing and command implementation during the access orchestration ZGO.

Variability points describe features in which different versions of a component can differ and open variability points are not yet bound, i.e., unbound variability points, visible "externally" and are therefore retained, while all others are omitted in the interests of reducing complexity.

Then, in a fifteenth state Z15, in the course of the user-based data and command input during the access orchestration ZGO, the user ANW or user BEN reviews the pre-selection and adapts the pre-selection to the open variability points. Then, in a sixteenth state Z16 in the course of the user-based data and command input during the access orchestration ZGO, the user ANW or user BEN specifies a name and identifier for a target component that has reduced complexity and is considered a possible reference model component.

On the basis of this specification, in a seventeenth state Z17 in the course of the logic-based data processing and command implementation during the access orchestration ZGO, guaranteed non-functional requirements are determined. These are features of the target component which are protected properties of the target component.

Example: A protected property could be the temperature at which the component can be operated. Or what reaction time the component can provide for certain inputs.

For this determination of the guaranteed, non-functional requirements, in the course of the rule-based specification during the access orchestration ZGO in an eighteenth state Z18, guaranteed non-functional requirement types are defined.

After the determination of the guaranteed non-functional requirements, in a nineteenth state Z19 in the course of the user-based data and command input during the access orchestration ZGO, the user ANW or user BEN reviews the pre-selection again and adapts the pre-selection to the guaranteed, non-functional requirements.

On the basis of this adaptation, in a twentieth state Z20 in the course of the logic-based data processing and command implementation during the access orchestration ZGO, visible functions are determined. This is the "externally" visible behavior of the target component as a possible reference model component or the "externally" visible functionality of the target component as a possible reference model component.

Example: The component can recognize and process human speech input. This is an "externally" visible functionality of the component.

For this determination of the visible functions, in the course of the rule-based specification during the access orchestration ZGO, in a twenty-first state Z21, visible function types are defined.

After the determination of the visible functions, in a twenty-second state Z22 in the course of the user-based data and command input during the ZGO access orchestration, the user ANW or user BEN reviews the pre-selection once again and adapts the pre-selection to the visible functions.

On the basis of this repeated adaptation and at the end of the second orchestration phase OP-2, externally visible, technical interfaces are identified in a twenty-third state Z23 in the course of the logic-based data processing and command implementation during the access orchestration ZGO.

These are primarily technical interfaces of the target component as a possible reference model component, which are visible "externally" and thus accessible.

Example: The component has a "Universal Serial Bus <USB>" port.

For this determination of the externally visible, technical interfaces, externally visible technical interface types are defined in the course of the rule-based specification during the access orchestration ZGO, in a twenty-fourth state Z24.

With the determination of the externally visible, technical interfaces, the transition from the second orchestration phase OP-2 to the third orchestration phase OP-3 now takes place according to the access orchestration ZGO.

According to the third orchestration phase OP-3 during the access orchestration ZGO, a reduction of the sub-model content is performed based on the determined reduction potential and the reference model component $RMK_x$ is generated.

The starting point for this is after the transition from the second orchestration phase OP-2 in the twenty-third state Z23 to the third orchestration phase OP-3 in a twenty-fifth state Z25. In this twenty-fifth state Z25, in the course of the user-based data and command input during the access orchestration ZGO, the user ANW or user BEN reviews the pre-selection once again and adapts the pre-selection to the externally visible, technical interfaces.

On the basis of this repeated adaptation, in a twenty-sixth state Z26, in the course of the logic-based data processing and command implementation during the access orchestration ZGO, the suitable reference model component $RMK_x$ with the reduced complexity will be generated in the selected target model and/or in the selected target library and in the selected target package based on the selection of the user ANW or user BEN.

After the generation of the suitable reference model component $RMK_x$ with the reduced complexity, this is ready for re-use and is transferred to the modeling tool MW for this purpose in a twenty-seventh state Z27. For this purpose, the reference model component $RMK_x$ contains sub-elements broken down according to perspectives, such as the open variability points, the guaranteed non-functional requirements, the visible functions, and the externally visible technical interfaces.

At the end of the access orchestration ZGO, of the third orchestration phase OP-3 and the end of the flow diagram, in a twenty-eighth state Z28 in the course of the user-based data and command input the user ANW or user BEN reviews the result of the access orchestration ZGO and the graphical user interface GBOF <GUI> is closed and terminated.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for reference model-based, component-related development of a technical system, in which with respect to a technical reference system comprising a plurality of reference system components, which each contribute to the function of the technical reference system and are represented digitally by a stored digital twin as a complex reference model of the technical reference system, reference model components for the development of the technical system can be re-used by accessing the digital twin, wherein
    a) a computer-aided access orchestration, in which the access is orchestrated with a user-based data and command input as well as a logic-based data processing and command implementation according to a rules-based specification, and for a dedicated system component provided for the development of the technical system, in particular by user selection, which contributes to the function of the technical system, a reference model component of the re-usable reference model components which is suitable for this purpose is determined with respect to the reference system using the reference system components, with which,
    a1) in a first orchestration phase a storage location in the digital twin is determined for the reference model component suitable for the development of the technical system;
    a2) in a second orchestration phase, a sub-model content of the digital twin associated with the storage location and a reduction potential of the sub-model content are determined in relation to an extent required with the re-use of the reference model component for the development of the technical system; and
    a3) in a third orchestration phase a reduction of the sub-model content is carried out according to the determined reduction potential and the reference model component is generated.

2. The method as claimed in claim 1, wherein the storage location for the suitable reference model component is determined by a staged determination of a target model and/or a target library of the reference model and subsequently of a target package as a substructure of the target model and/or the target library of the reference model with respect to a sub-model content of the digital twin.

3. The method as claimed in claim 2, wherein the sub-model content associated with the storage location and relevant to the re-use and the reduction potential of the sub-model content are determined with respect to an extent required with the re-use of the reference model component for the development of the technical system by, in the following specified order, determining variants of the reference model component in the event that the reference model is overrepresented in terms of components, determining open variability points, determining guaranteed, non-functional requirements, determining visible functions and determining externally visible technical interfaces.

4. A computer program product, comprising a non-transitory computer readable hardware storage device having computer readable program code stored therein, said program code executable by a processor of a computer system to implement a method for the reference model-based, component-related development of a technical system comprising a non-volatile, readable memory in which processor-readable control program commands of a program module for reference model-based, component-related development of the technical system are stored, and comprising a processor which is connected to the memory and executes the control program commands of the program module for system development, wherein for this purpose in relation to a technical reference system comprising a plurality of reference system components, each contributing to the function of the technical reference system and being represented digitally by a stored digital twin as a complex reference model of the technical reference system, reference model components for the development of the technical system can be re-used by accessing the digital twin, wherein the processor and the program module for the development of the technical system are configured in such a way that
    a) in the course of an access orchestration, in which the access is orchestrated with a user-based data and command input as well as a logic-based data processing and command implementation according to a rules-based specification, and for a dedicated system component provided for the development of the technical system, in particular by user selection, which contributes to the function of the technical system, a reference model component of the re-usable reference model components suitable for this purpose is determined with respect to the reference system using the reference system components;
    a1) in a first orchestration phase a storage location in the digital twin is determined for the reference model component suitable for the development of the technical system;
    a2) in a second orchestration phase, a sub-model content of the digital twin associated with the storage location and a reduction potential of the sub-model content are determined in relation to an extent required with the re-use of the reference model component for the development of the technical system; and
    a3) in a third orchestration phase a reduction of the sub-model content is carried out according to the determined reduction potential and the reference model component is generated.

5. The computer program product as claimed in claim 4, wherein the processor and the program module for the development of the technical system are configured in such a way that the storage location for the suitable reference model component is determined with respect to a sub-model content of the digital twin by staged determination of a target model and/or a target library of the reference model and subsequently of a target package as a substructure of the target model and/or the target library of the reference model.

6. The computer program product as claimed in claim 5, wherein the processor and the program module for the development of the technical system are configured in such a way that the sub-model content associated with the storage location and relevant to the re-use and the reduction potential of the sub-model content are determined with respect to an extent required with the re-use of the reference model component for the development of the technical system by, in the following specified order, determining variants of the reference model component in the event that the reference model is overrepresented in terms of components, determining open variability points, determining guaranteed, non-functional requirements, determining visible functions and determining externally visible technical interfaces.

7. A system comprising:
   one or more processors;
   a memory in communication with the one or more processors comprising a modeling tool;
   wherein the modeling tool comprises a control device and an input/output interface connected to the control device for user input and output, wherein the control device is connected to a database for storing the digital twin, and wherein the computer program product as claimed in claim 4 can be loaded into the control device, such that the modeling tool is for the reference model-based, component-related development of the technical system, in which, with respect to the technical reference system comprising the plurality of reference system components, each contributing to the function of the technical reference system and being digitally represented by the stored digital twin as the complex reference model of the technical reference system, reference model components for the development of the technical system can be re-used by accessing the digital twin.

\* \* \* \* \*